(12) United States Patent
Maggiore et al.

(10) Patent No.: US 9,947,140 B2
(45) Date of Patent: Apr. 17, 2018

(54) CONNECTION METHOD, VISUALIZATION SYSTEM AND COMPUTER PROGRAM PRODUCT

(71) Applicant: Sartorius Stedim Biotech GmbH, Goettingen (DE)

(72) Inventors: Frank Maggiore, Port Jefferson Station, NY (US); Stefan Schlack, Goettingen (DE)

(73) Assignee: Sartorius Stedim Biotech GmbH (DE)

( * ) Notice: Subject to any disclaimer, the term of this patent is extended or adjusted under 35 U.S.C. 154(b) by 0 days.

(21) Appl. No.: 14/854,446

(22) Filed: Sep. 15, 2015

(65) Prior Publication Data

US 2017/0076500 A1    Mar. 16, 2017

(51) Int. Cl.
| | |
|---|---|
| *G06T 19/00* | (2011.01) |
| *G06T 19/20* | (2011.01) |
| *G06F 3/0484* | (2013.01) |
| *G06F 3/0482* | (2013.01) |

(52) U.S. Cl.
CPC .......... *G06T 19/006* (2013.01); *G06F 3/0482* (2013.01); *G06F 3/04845* (2013.01); *G06F 3/04847* (2013.01); *G06T 19/20* (2013.01); *G06T 2219/2008* (2013.01)

(58) Field of Classification Search
None
See application file for complete search history.

(56) References Cited

U.S. PATENT DOCUMENTS

| | | | | |
|---|---|---|---|---|
| 8,749,396 | B2 * | 6/2014 | Maggiore | G06T 19/006 340/540 |
| 2008/0228450 | A1 * | 9/2008 | Jakobsen | G06T 17/10 703/2 |
| 2010/0241403 | A1 * | 9/2010 | Jakobsen | G06T 17/10 703/1 |
| 2013/0038633 | A1 * | 2/2013 | Maggiore | B01D 65/104 345/633 |
| 2013/0278635 | A1 | 10/2013 | Maggiore | |
| 2014/0378022 | A1 * | 12/2014 | Muthyala | A63H 33/06 446/91 |

FOREIGN PATENT DOCUMENTS

WO    2011/154072    12/2011

* cited by examiner

*Primary Examiner* — Tize Ma
(74) *Attorney, Agent, or Firm* — Gerald E. Hespos; Michael J. Porco; Matthew T. Hespos

(57) ABSTRACT

A method for a measurement or production setup includes providing a visualization system with a processor, an output device and a capturing module for capturing identification data of a working space. The method further provides a first setup component having at least one first marker at the working space and provides a second setup component having at least one second marker at the working space and being connectable to the first setup component through at least one connection. The method captures identification data about the markers and identifies the markers. The processor retrieves digital information for the markers from a database and makes a decision on the connection of the setup components based on the retrieved digital information and the captured identification data. The method then outputs a visual representation of the connection between the first and second setup components according to the decision.

20 Claims, 9 Drawing Sheets

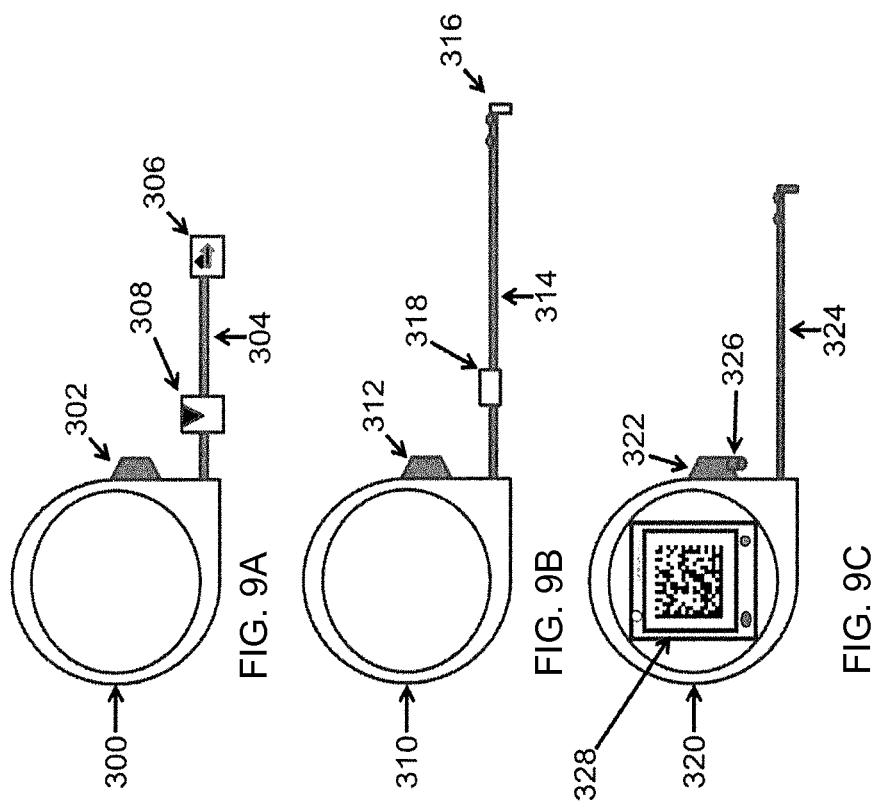

CONNECTION METHOD, VISUALIZATION SYSTEM AND COMPUTER PROGRAM PRODUCT

BACKGROUND

1. Field of the Invention

The present invention relates to improvements for the assembling of a measurement or production setup, in particular with regard to the connections linking two or more components of the setup.

2. Description of the Related Art

It is known in the art to assemble measurement or production setups manually from a plurality of components. For this purpose, the assembly and correct connection of different parts to be assembled are inspected visually and/or manually. Before putting the assembly of the components into operation, an operator has to check all connections and may consult technical data sheets and select feasible components in order to assemble the setup according to predetermined specifications.

As the complexity of measurement or production setups increases, designing and configuring a plurality of components as well as the connections between them becomes increasingly difficult. This issue is particularly important for single-use equipment within the biopharmaceutical industry where, for example, a disposable container has multiple connections for the input and output of fluids, for receiving power, for communicating with sensors or other elements and the container is further connected to other equipment containing multiple components and connections to form a complex setup configured to carry out a single unit operation.

U.S. Pat. No. 8,749,396 B2 discloses an augmented reality system that employs variable markers associated with setup components to decide whether a connection between two components is established correctly or not. WO 2011/154072 A1 discloses an augmented reality system that utilizes markers associated with setup components to decide whether two components are compatible or not.

An object of the present invention is to provide a method, a visualization system and a computer program product that enables an operator to design and optimize a measurement or production setup by efficiently configuring its connections and components.

SUMMARY

According to one aspect, a connection method for a measurement or production setup is provided. The method comprises the following steps: providing a visualization system with a processing device, an output device and at least one capturing module, whereby the at least one capturing module is capable of capturing identification data belonging to a working space; providing a first setup component having at least one first marker at the working space; providing a second setup component having at least one second marker at the working space, wherein the second setup component is connectable to the first setup component through at least one connection; capturing identification data about the first marker and the second marker by the at least one capturing module; identifying the first and second markers, whereby the processing device retrieves respective digital information assigned to the identified first marker and second marker from a database and whereby the processing device makes a decision on the at least one connection of the first setup component with the second setup component based on the retrieved digital information and the captured identification data; outputting a visual representation of the at least one connection between the first setup component and the second setup component according to the decision.

According to another aspect, a visualization system for connections in a measurement or production setup. The visualization system comprises: at least one capturing module capable of capturing identification data belonging to a working space; a processing device, which is communicatively connected to the at least one capturing module, and which is capable of detecting the presence of a first marker of a first setup component and a second marker of a second setup component in the identification data captured by the at least one capturing module, wherein the second setup component is connectable to the first setup component through at least one connection, identifying the first and second marker, retrieving a digital information assigned to the identified first and second markers from a database, and making a decision on the at least one connection of the first setup component with the second setup component based on the retrieved digital information and the captured identification data; an output device for outputting a visual representation of the at least one connection between the first setup component and the second setup component according to the decision of the processing device.

According to a further aspect, a computer program product for a computer-aided connection in a measurement or production setup is provided, wherein the computer program comprises coding segments that when loaded and executed on a suitable system can execute a method according to the first aspect.

Details of exemplary embodiments are set forth below with reference to the exemplary drawings. Other features will be apparent from the description, the drawings, and from the claims.

BRIEF DESCRIPTION OF THE DRAWINGS

FIGS. 9A-9C show examples of external measuring tools for the manual measurement of distances.

DETAILED DESCRIPTION

Figure 1:
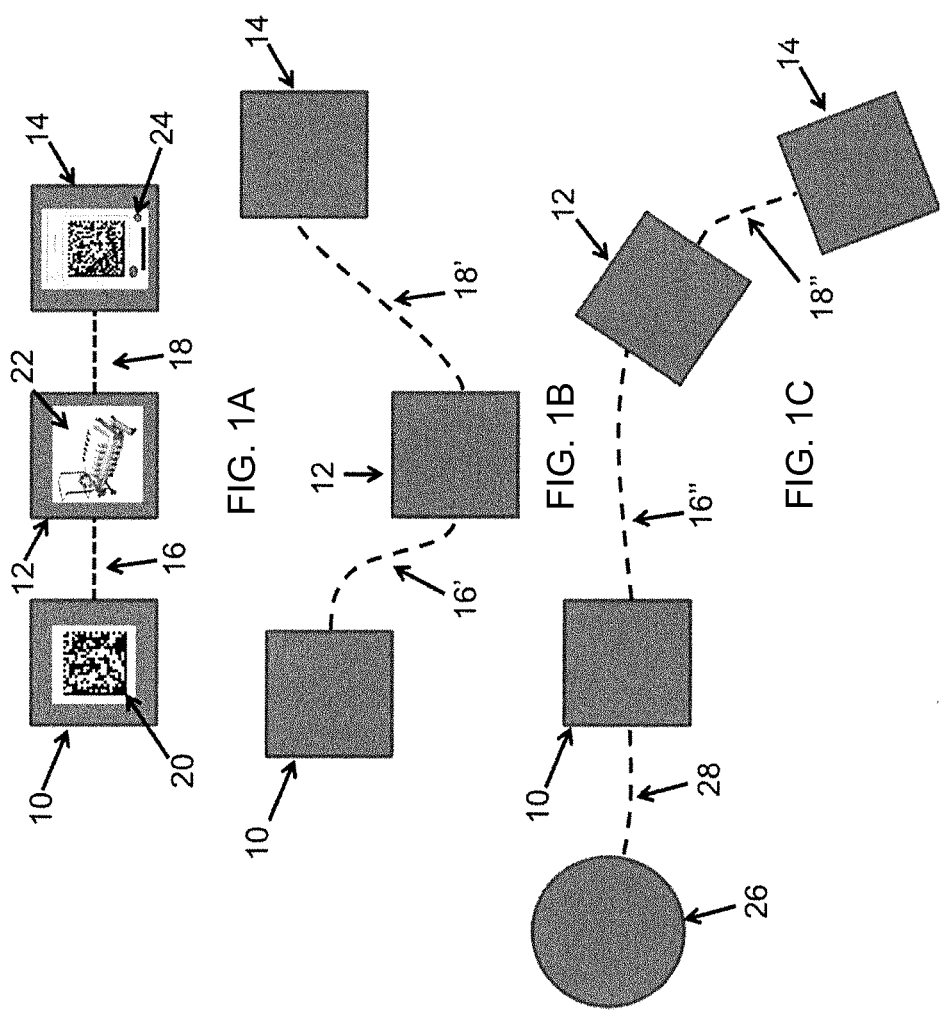
FIGS. 1A-1C show examples of configurable connections between a plurality of components utilizing physical marker tracking.

In the following text, a detailed description of examples will be given with reference to the drawings. It should be understood that various modifications to the examples may be made. In particular, one or more elements of one example may be combined and used in other examples to form new examples.

The present invention relates to the configuring and displaying of virtual or augmented connections between physical, augmented or virtual setup components through a visualization system.

A component of the setup may be any object, such as a device and/or a system, belonging to the equipment of a measurement or production setup.

Setups for measurement or production may comprise various laboratory setups or industrial setups such as setups for testing the integrity and/or filter capacity and/or filterability of a filter device, setups for testing the leak-tightness of container and/or disposable bags, setups for charging, controlling and/or discharging bioreactors, setups for a bioreactor filtration unit operation with a single-use bioreactor container, a pump, a depth filtration unit (for cell and cell debris removal), and a single-use storage bag, and so on.

Exemplarily, the components may be pumps, valves, filter devices, hose connections, flasks, reactors, containers, coolers, heaters, supply terminals, control devices, sensor devices (e.g. temperature sensors, pressure sensors, optical sensors) and combinations thereof. In one example, the components may be single-use components.

The components are connectable to each other, wherein the connections may comprise a fluid connection, an electrical connection and/or a mechanical connection. The connections between the components may conduct movement, power, data and materials for all the inputs and outputs of a setup. Exemplarily, the connections may be pipes, tubes, hoses, cables, conveyor belts, and combinations thereof. In some examples, the connections may comprise a moving connection, i.e. a connection wherein at least one of the two ends is not fixed. A moving connection may comprise e.g. a track along which the end of a cable can slide while maintaining the connection and/or a moving robotic arm that automatically finds the point to which it must connect.

The connection method may be computer-aided. The connection method using a visualization system may assist in the configuration and design of multiple equipment components that are connected with a plurality of connections while reducing the probability of erroneous configurations for complex systems. Through the altering of spacing and setup configurations of the components and their connections, an optimization of the setup may be achieved.

The visualization system may be an augmented reality, virtual reality, or mixed reality system. Augmented reality is an enhanced version of a physical, real-world environment whose elements are augmented by computer-generated input that can include objects and/or information. Virtual reality is the computer-generated simulation of a three-dimensional environment that can be interacted with in a seemingly real or physical way by a person using e.g. special electronic equipment. Mixed reality refers to an environment that combines real and virtual objects and information.

The connections outputted by the visualization system may be virtual connections in a virtual environment or augmented connections, such as augmented reality connections between existing setups or enhanced versions of existing, physical connections. Similarly, the components visualized in the visualization system may be physical components in that they correspond to physical components existing in the real world. Alternatively, the components may be augmented components based on real-world components and provided with supplementary features such as extra elements or superimposed information. Finally, the components may be entirely virtual components only existing within the visualization system.

The physical, augmented or virtual components may be located in a working space, which may comprise the whole setup or a section of the setup. A working space may contain any combination of physical and virtual components. For example, a working space may be a laboratory, a workshop, a sterilized chamber, and so on. If only virtual components are used, the working space may also be a virtual space generated in the visualization system. The virtual reality setup may exist within a physical working space and may be generated by scanning the room with a depth camera, a laser range finder, LIDAR, echolocation, and/or other room scanning technology system.

The components may have at least one marker at the working space. According to one example, the marker may be of a physical type that is embedded and/or mounted on devices, products, parts, items or consumables or combinations thereof in order to read a unique identification from the respective marker and/or localize the respective marker. The marker may also be the shape of the components itself. The marker may comprise optical markers, such as bar codes, color codes, pictograph, the shape of items, alphanumeric characters, or electromagnetic markers, such as radio-frequency identification (RFID) tags, metal stripes, audio markers, magnetic markers, or other marker types.

The marker may comprise a marker device that may actively communicate data to the visualization system and collect information about its surroundings. The marker device may comprise a plurality of devices, including but not limited to, a sensing device, such a camera, a high speed camera, a charge-coupled device (CCD), an RFID device, a near field communication (NFC) device, a microphone, a photodiode, an infrared sensing device, a motion tracking device, an eye tracking device, a light sensing device, a light spectrum sensing device, and other specialized sensor devices for completing a specific work task; a display device, such as a digital display, an electronic ink display, liquid crystal display (LCD), light emitting diode (LED) display, an organic light emitting diode (OLED) display, a plasma display, a heads-up display (HUD), a wearable display, a projection display, an ultra-high speed projection display, a fluorescence display, a mechanical display, a haptic display, an audio display, an ultrasound display, or other specialized display devices for completing a specific work task; a communication device, such as a wired connection such as a universal serial bus (USB) connection, a serial connection, an RS-232 connection, an Ethernet connection, a telephone connection, a DSL connection, a fiber optic connection, a cable connection, a BNC connection, or other wired connection ports, a wireless communication device, such as a WiFi connection, a cellular connection, an active RFID connection, an NFC connection, a radio connection, a visual connection or other wireless sources; and a power device, such as a rechargeable battery, a battery, a powercord or other wired connection, a powered communication port (USB), a solar cell, a mechanical power source, an electromechanical power source (such as a hand crank), or a wireless power source.

According to another example, the marker may be a simulated virtual marker that comprises a virtual geospatial location that is displayed on an output device of the visualization system. The virtual marker may be positioned on the output device using a position in the working space acquired from a capturing module and processed by a processing device. The virtual marker may be virtually moved into position within the working space using at least one input device. The at least one input device may be any one of a touch screen device, a hand tracking device, a gesture tracking device, a body tracking device, an eye-tracking device, a gaze tracking device, a electromyography (EMG) tracking device, a brain or human controlled interface and other externally linked peripheral such as a keyboard, mouse, stylus and gloved sensors.

A marker may also be a variable marker, namely a marker that is in a first marker state when the respective setup component is disconnected from another setup component and in a second marker state when the respective setup component is connected to another setup component and wherein the variable marker turns from the first marker state to the second marker state, when the components are connected.

The visualization system may comprise a processing device, an output device and at least one capturing module.

The processing device may comprise a microcontroller, a microprocessor, and/or an integrated circuit configured to receive data from the at least one capturing module and transmit data to the output device. The processing device can be part of a computing system such as a personal computer, a mobile computing device, a wearable computing device, or a device linked to a cloud computing device through a communication device.

The output device may comprise any one of a display device such as a monitor, a visual touch screen, a projector, a mobile device screen, a notebook or a table computer screen, a heads up display, a head mounted display (e.g. glasses having an incorporated display), a wearable display, a printer, a haptic device, a wired or wireless audio/visual/sensory device, or a combination of such devices. The display device may be configured for displaying the augmented reality, virtual reality, and/or mixed reality images to an operator as a merged or new display with the first and/or second marker and/or the respective first and/or second component. The output device may comprise a haptic device for outputting the augmented or virtual image as a merged display or output for physically sensing the respective marker. The augmented or virtual image may be adjusted and/or displayed in accordance with the selective positioning of the respective marker by the user. The display of the augmented or virtual image may be altered to show the merged display in real-time in accordance with the position and orientation of the markers.

The at least one capturing module may comprise any of the following: a camera device, a video camera, an RFID scanner device, a Global Positioning System (GPS) device, a bar-code scanner device, a microphone, a laser reader device, a detector of electronic signals, a medical scanner, an electronic or visual input detection device from industrial and/or laboratory and/or pharmaceutical equipment, a motion detection system, a visual detection system, an audio detection system, a sensory detection system, a (infrared) depth scanning device, a laser scanning device, a LIDAR system, a radar system, an echolocation system, a tape measure, a ruler, a carpenter's square, a level or a combination of such devices. In one example, the capturing module may be used for capturing identification data about a marker, such as the appearance and/or the real-time position of the marker. In another example, the at least one capturing module may be employed for markerless tracking of the components, e.g. by using a depth scanning device or radar system. Markerless tracking may yield a physical coordinate in space and does not require a physical component. Markerless tracking may use e.g. a depth scanner to scan a room and place a component in a position chosen by the operator or by the software based on the room layout.

The capturing module may comprise measurement markers that can be positioned at or on the components for measurement by the capturing module. The measurement markers may consist of visual markers, electromagnetic markers, RFID's, metal stripes, magnetic markers, audio markers, or other marker types.

The at least one capturing module may provide the identification data to the processing device and/or the output device through a wired or wireless communication system. The at least one capturing modules may be powered by a powercord, a powered data cable (USB), a battery, and/or wireless power sources.

The at least one capturing module may be located in an area of industrial manufacturing and/or a laboratory in the field of processing, mining, petrochemistry, energy, automotive, aerospace, construction, water purification, water treatment, pharmaceutics and bio-pharmaceutics near or within the working space.

The at least one capturing module may be setup as a singular, as multiple, as remote, or as networked devices. A singular capturing module may be placed in a fixed or movable position, inside or outside of the working space and can connect directly to the processing device and/or the output device through wired or wireless connections. Multiple capturing modules may be placed in fixed and/or movable positions, inside and/or outside of the working space and may connect directly to the processing device and/or to the output device or to other capturing modules through wired or wireless connections. A remote capturing module may be placed away from the working space unit but within a remote working space connected by hosing, tubing and/or piping lines. Networked capturing modules may be located in fixed and/or movable positions, inside and/or outside of the working space and may be connected to other capturing modules or through connection hubs that can encompass multiple locations and multiple systems. These networked hubs may connect to a single processing device and/or to multiple processing devices and a single display device and/or to multiple display devices through wired or wireless connections.

Depending on the capturing module, the identification data may comprise image data captured at the working space by a camera, data read out from barcodes and/or RFID/NFC tags, audio data, video data, measurement data, etc.

The at least one capturing module and/or the output device may be part of a mobile device. In other words the mobile device may comprise the output device, such as a display or a touch screen, and/or at least one capturing module, wherein further capturing modules not part of the mobile device may be connected to the mobile device, in particular to the output device, via a wired or wireless connection. Furthermore, the processing device may also be part of the mobile device. In other words the visualization system may be designed as a mobile device, such as a smartphone, wearable device or a mobile computer.

Once identification data about a marker has been acquired by the at least one capturing device, the processing device may identify the marker. The identifying of a marker may comprise the recognition of a marker as such and the assignment or association of the identified marker to a unique component or to a type of identical components. The assignment between a marker and a component or type of component may be performed according to an assignment list, which can be stored in a database. Further digital information may be assigned to the identified marker within the database.

Additional digital information may include, but is not limited to, data sheets, instructions, certifications, directions for use, validation guides, replacement part lists, assembly diagrams; serial, model, and lot/batch numbers; reorder information, pricing information, or any other useful information to provide to the operator.

For example, data sheets and/or configuration parameters may be contained in the database, which can be a local database or a remote database. The database may be divided into a plurality of local and/or remote databases each of which can contain a different type of information. Information concerning the component may also be stored in the marker itself. For example two dimensional barcodes or RFID tags comprise an amount of information storage capacity, e.g. several hundreds or thousands of bytes, in order to store specific data about the component, at which the respective marker is mounted. Most recent data sheets and updated configuration parameters for recent items or products may be provided by the manufacturer or sales representative of the respective items or products via a remote database. The remote database may be made available via an internet connection, a wireless connection, a serial connection or a telephone line.

The visualization system may, thus, detect the nature of and the relationship between multiple physical, augmented or virtual components based on the retrieved digital information and the captured identification data, and subsequently decide on the connections between the components. Exemplarily, the capturing module may measure the dimensions of the working space and the distance between the components, whether physical or virtual. The deciding step may comprise selecting, by the processing device, a suitable connection for the components based e.g. on their nature, their distance, the overall dimensions of the working space and a degree of slack for the connections. The suitable connection may be exemplarily retrieved from the database. In another example, the decision on the connection may correspond to a calculation by the processing device of a suitable connection for the components on the basis of the available data.

The visualization system may then provide an operator with a configurable, virtual connection between the components, according to the decision of the processing device.

At least part of the digital information and the identification data may be communicated to the output device. Through the processing device, a visual model of the components and their virtual connections may be outputted. The visual model representation may comprise adjustable configuration parameters such as the size of the components, the diameter of the connections (e.g. piping or tubing), the materials utilized, and so on. The configuration parameters may be altered manually via an input device or optimized automatically to determine the optimal configurations for the process setup. Exemplarily, if the components and/or their respective markers are moved within the working space by an operator, the visualization system may capture updated identification data and adjust the virtual connections between the components to the new separation distance between the components.

As explained above, the components of the setup may be physical, augmented or virtual components. Furthermore, the markers may be physical markers or virtual markers. The connection method may be applied to any combination of components and markers.

FIGS. 1A-1C show an example of configurable connections between a plurality of components utilizing physical marker tracking. According to this example, a first component 10, a second component 12 and a third component 14 may be provided in a working space with respective markers 20, 22 and 24. The markers 20, 22 and 24 may be physical markers that exist in the real world, whereas the components 10, 12 and 14 may be virtual components. The at least one capturing module of the visualization system may capture identification data about the markers 20, 22 and 24, the identification data exemplarily comprising the placement of the physical markers 20, 22 and 24 within a working space. The processing device may configure virtual components 10, 12 and 14 that are scaled and positioned utilizing the physical markers and accordingly displayed to an operator via the output device.

FIG. 1A is a top view of the three virtual components 10, 12 and 14. In one example, the components 10, 12, and 14 may represent individual pieces of process equipment such as a bioreactor, a filtration skid, and a storage tank. In another example, the components 10, 12, and 14 may alternatively represent single-use products such as single-use bags, filters, and containers. Exemplarily, the physical markers 20, 22 and 24 may be a visual barcoded marker 20, a visual image based marker 22, and a marker device 24, which will be described in more detail with reference to FIG. 7. The processing device may identify the physical markers 20, 22 and 24 and retrieve respective digital information, e.g. about the nature of the components. The processing device may then make a decision on the connections between the components on the basis of the retrieved digital information and the captured identification data. The visualization system may output a visual representation of the connections 16 and 18 between the components 10, 12 and 14 according to the decision, as shown in view 'A'. For example, a connection 16 between components 10 and 12 may be a virtual connection and the connection 18 between components 12 and 14 may be an augmented or virtual connection. These connections may include but are not limited to piping, tubing, fluid connections, cable connections, conveyor belts and so on.

FIG. 1B is a top view of the three virtual components 10, 12 and 14, where the positions of the physical markers 20, 22, and 24 have been moved. Consequently, the visualization system may modify the virtual placement of the components and re-evaluate its decision about the connections (e.g. re-calculate the connections) between the components, outputting modified connections 16' and 18'. With respect to view 'A', the first component 10 has been moved back, the second component 12 has been moved forward, and the third component 14 has been moved to the back and to the right. The visualized connections 16' and 18' between these virtual components may be automatically adjusted in position and length by the processing device based on the movements of the physical markers 20, 22 and 24. The movement of the physical markers 20, 22 and 24 may be detected by the at least one capturing device, and the corresponding virtual components 10, 12 and 14 may be repositioned by the processing device, and accordingly displayed to the operator by the output device.

FIG. 1C is a top view of three virtual components 10, 12 and 14, where the positions of the physical markers 20, 22 and 24 have been moved according to another example. The first component 10 has been moved left, the second component 12 has been moved right and angled, and the third component 14 has been moved forward and angled. The connections 16" and 18" between these virtual components are automatically adjusted based on the movements of the physical markers 20, 22 and 24. In addition to the virtual components 10, 12 and 14, a physical component 26, such as a storage tank, may be present within the same working space and a virtual connection 28 may be configured between the virtual components and the physical component. For example, the physical component 26 may have a virtual connection 28 with the first component 10. The physical component 26 may have a physical marker placed on it for detection and positioning by the visualization system, so that the virtual connection 28 between the physical component 26 and the virtual components 10, 12 and 14 linked to the physical markers 20, 22 and 24 may be decided upon and outputted.

Figure 2:
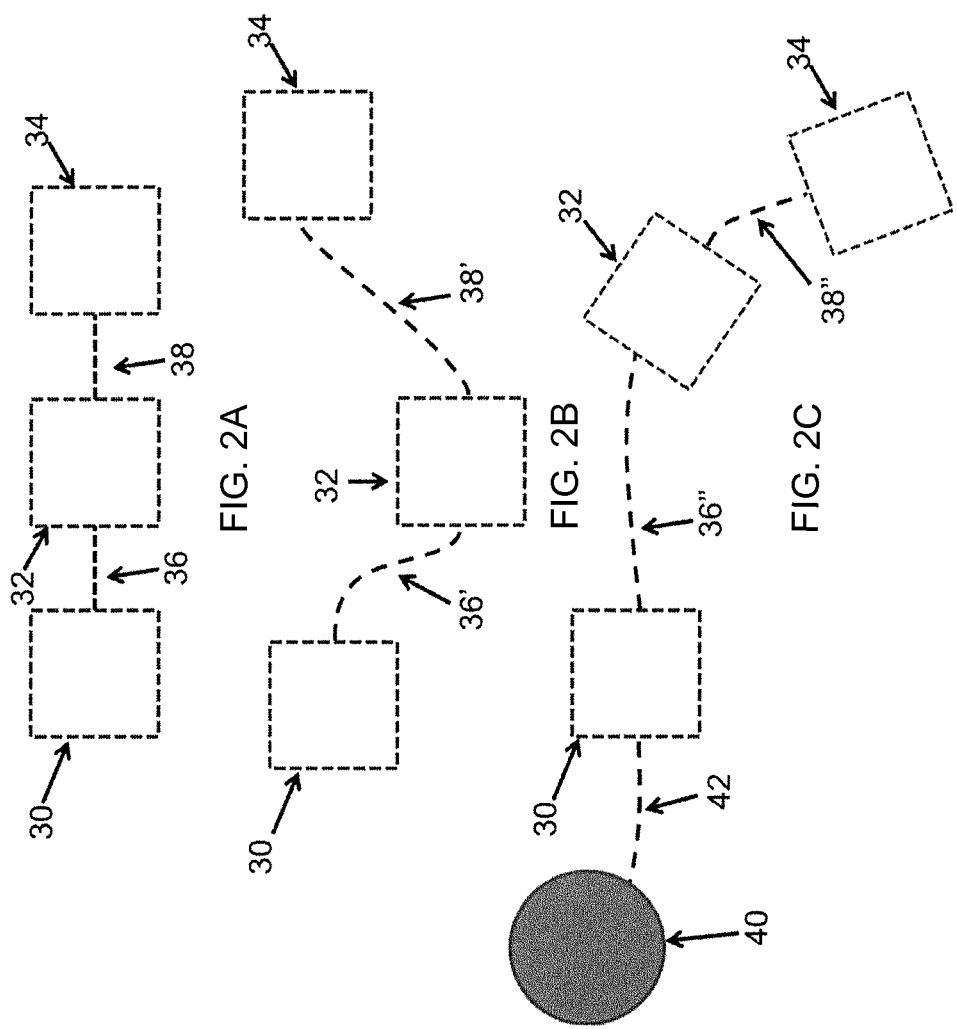
FIGS. 2A-2C show examples of configurable connections between a plurality of components utilizing virtual marker tracking.

FIGS. 2A-2C show an example of configurable connections between a plurality of components utilizing virtual marker tracking. FIG. 1A shows a first component 30, a second component 32 and a third component 34 that may be provided in a working space as virtual components. According to one example, the capturing device may perform measurements to determine the layout of the working space, which may be elaborated by the processing device and displayed by the output device. The operator may then use virtual marker tracking to scale and position the components 30, 32 and 34 within the working space at the output device. Virtual marker tracking may comprise, but is not limited to, virtual markers, edge-based tracking, texture tracking, depth scanning, GPS location tracking, SLAM tracking, terrain mapping, and virtual variable marker tracking. For example, the operator may input and subsequently alter the position and/or dimensions of the virtual components utilizing an input device and/or method such as a touch screen, hand tracking, body movements, gaze tracking, and others or a combination thereof. The at least one capturing module of the visualization system may capture identification data about the virtual markers and the processing device may identify the virtual markers and retrieve corresponding digital information. The processing device may then make a decision on the connections between the components and the visualization system may output a visual representation of the connections 36 and 38 between the components 30, 32 and 34 according to the decision, as shown in view 'A'. For example, a connection 36 between components 30 and 32 may be a virtual connection and the connection 38 between components 32 and 34 may be an augmented or virtual connection.

FIG. 2B is a top view of the three virtual components 30, 32 and 34, where the positions of the virtual markers have been modified via the input device. Consequently, the visualization system may modify the virtual placement of the components and re-evaluate its decision about the connections (e.g. re-calculate the connections) between the components, outputting modified connections 36' and 38'. With respect to view 'A', the first component 30 has been moved back, the second component 32 has been moved forward, and the third component 34 has been moved to the back and to the right. The visualized connections 36' and 38' between these virtual components automatically may be automatically adjusted in position and length by the processing device based on the displacement of the visual markers.

FIG. 2C is a top view of the three virtual components 30, 32 and 34, where the positions of the virtual markers have been modified via the input device according to another example. The first component 30 has been moved left, the second component 32 has been moved right and angled, and the third component 34 has been moved forward and angled. The connections 36" and 38" between these virtual components are automatically adjusted based on the displacement of the virtual markers. In addition to the virtual components 30, 32 and 34, a physical component 40, such as a storage tank, may be present within the same working space and a virtual connection 42 may be configured between the virtual components and the physical component. For example, the physical component 40 may have a virtual connection 42 with the first component 10. The physical component 40 may have a physical marker placed on it for detection and positioning by the visualization system, so that the virtual connection 42 between the physical component 40 and the virtual components 30, 32 and 34 linked to the virtual markers may be decided upon and outputted.

As explained above, additionally or alternatively to physical markers and/or virtual markers, a markerless tracking may be utilized by the visualization system for positioning components in a working space and identifying such components. The capturing module may capture identification data about the components directly, without the need for markers, and digital information about the components may be retrieved by the processing device on the basis of the captured identification data.

Whether with marker or markerless tracking or a combination of the two, the visualization system positions the components in the working space and outputs a visual representation of the components with connections between them. The components, the connections between them and the parameters of the components and/or connections may be changed by an operator through the visualization system or through an external input device linked to the visualization system. The operator may move the physical markers within the workspace or move the positions of the virtual markers through the output device to change the positioning of the components. Consequently, the positioning and the measurement for the virtual length of the connections and the associated components within the workspace displayed by the output device of the visualization system may be modified.

Figure 3:
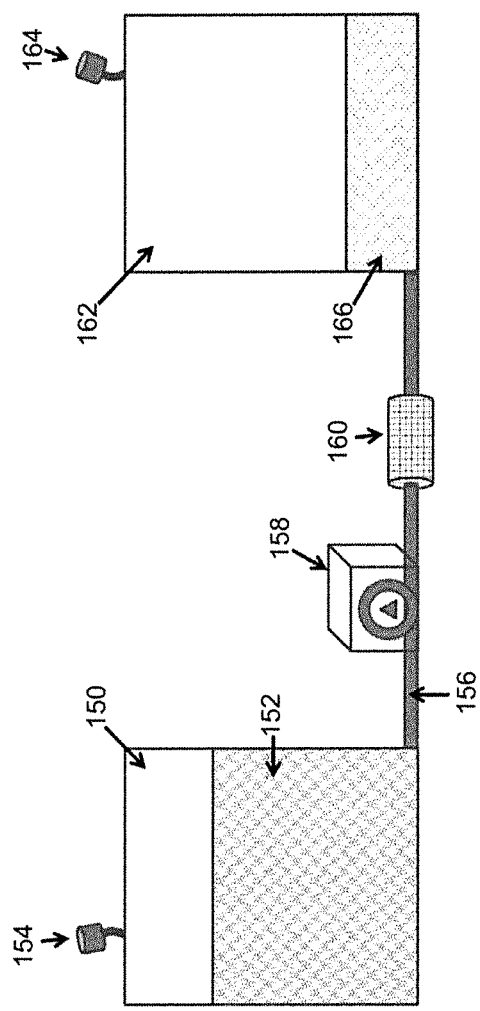
FIG. 3 shows an example of a configurable setup comprising fluid connections between a plurality of virtual components.

FIG. 3 shows an example of a configurable setup comprising fluid connections between a plurality of virtual components. In this example, the components are two containers that may hold a fluid volume. The containers may be directly represented by the marker and/or markerless tracking or may be internal components of the equipment to which the tracking is associated with, such as a bioreactor and a storage tank. A container 150 may be a feed container that contains a fluid 152 and a container 162 may be a storage container that holds the processed fluid 166. The processing device of the visualization system may process the positioning of the containers 150 and 162 in the workspace after the capturing module captures identification data about the containers 150 and 162. The processing device may subsequently make a decision on a connection between the containers 150 and 162 and output a virtual representation of the connection via the output device. The virtual connection in this example may contain elements including, but not limited to, a length of tubing 156 to carry the fluid 152, a fluid pump 158 to move the fluid 152, and/or a filter 160 to process the fluid 152. The containers 150 and 162 may comprise vent filters 154 and 164, respectively.

An operator and/or a computer program may change the parameters of the components and their connections to fit the needs of the setup specifications and/or to optimize the setup. The parameters for the setup of FIG. 3 may include, but are not limited to: the size and volume of the feed container 150; the fluid type, volume and viscosity of the fluid 152 inside of the container 150; the size of the vent filter 154 on top of the feed container 150, which would affect the drain rate; the size, diameter, and type of the outlet port on the feed container 150; the type, length, and diameter of the tubing 156, which will affect the flow rate and the pressure limits; the type, size, and speed of the pump 158 for moving the fluid 152 through the length of tubing 156; the type, size, and differential pressure of the filter 160 and/or filter train utilized for processing the fluid 152; the size, diameter, and type of the inlet port on the storage container 162; the size and volume of the storage container 162; and the size of the vent filter 164 on top of the storage container 162, which would affect the fill rate. Additionally or alternatively, databases may be accessed to determine known, tested, or optimized combinations of components such as a filterability database which has profiles of the volumes, speed, plugging rate, and differential pressure ratings for a particular type of filter with a particular fluid such as a nutrient media.

Figure 4:
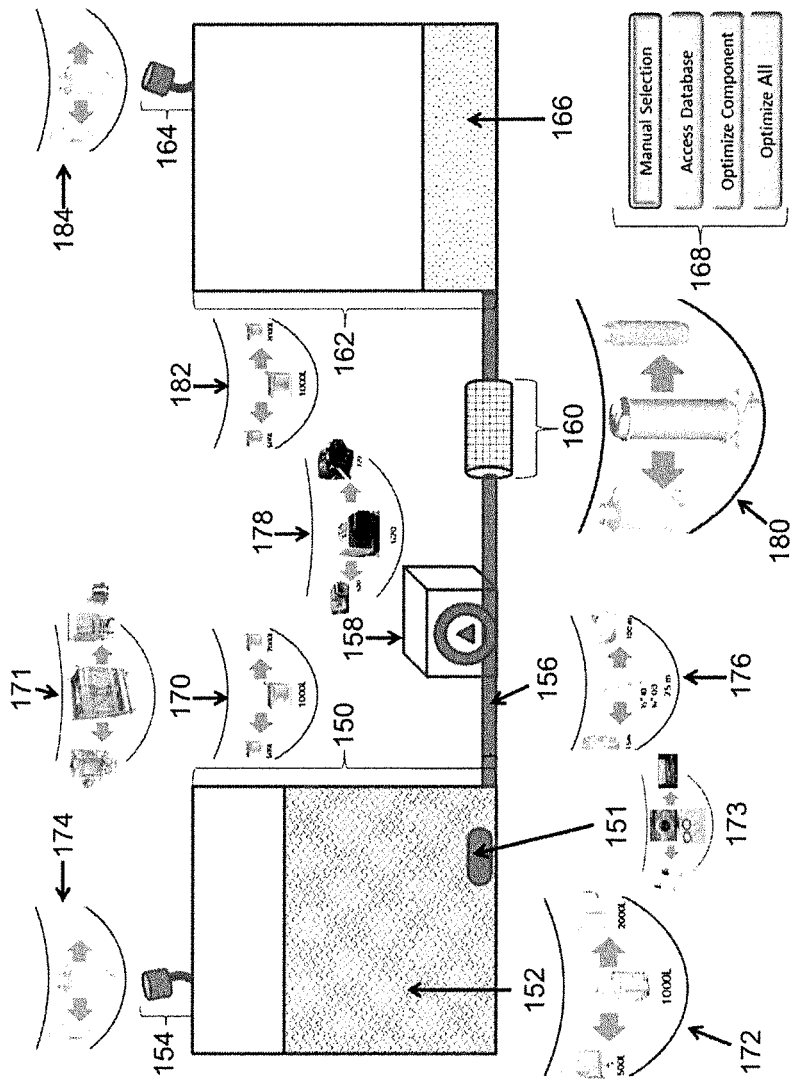
FIG. 4 shows an example of configuring the setup of FIG. 3.

As explained, the operator and/or the computer program may virtually configure an optimized setup by altering the parameters, sizing, and/or distances between the plurality of components associated with the setup. FIG. 4 shows an example of configuring the setup of FIG. 3. In this example, the operator may manually configure the setup utilizing an input device through the output device of the visualization system and/or an external input device. The operator may, for example, manually select components using a series of selection carousels for each product type. The feed container carousel 170 may be utilized to select a volume, size, type, film material, material compatibility, and ports for the feed container 150. The operator may swipe his hand over the carousel wheel, using an internal and/or external motion tracking device, to select the required component. The operator may further drill down to the equipment carousel 171 for the feed container 150, where options for the mixing type and other specifications are provided. The media carousel 172 may be utilized to select a media type, processing format (powder, liquid, or bags), volume, and viscosity of the fluid 152 to fill the container 150. The sensor carousel 173 may be utilized to select the sensor monitoring types (e.g. single-use sensors, pH, dissolved oxygen, temperature, viability . . . ) for the sensor ports 151 to be used for monitoring the feed container 150. The vent filter carousel 174 may be utilized to select type, material, size, filtration area, connections, and sterilization method of the vent filter 154 for the proper draining of the container 150. The tubing carousel 176 may be utilized to select type, diameter, length, maximum pressure, chemical resistance, material, connection and disconnection methods, sterilization method and related components (manifolds, splitters, 'Y' and 'T' connectors, etc. . . . ) of the tubing 156 for moving the fluid 152 material within a required timeframe. The pump carousel 178 may be utilized to select type, size, power, heads, connection types, and pressure ratings of the pump 158 for the moving the fluid 152 through the tubing 156. The filter carousel 180 may be utilized to select the filter 160 or a filter train for the processing of the fluid 152 based on chemical compatibility, material type, size, filtration area, connections, sterilization method, pressure drop, and filterability profile for the proper processing of the fluid 152 from the container 150. The storage container carousel 182 may be utilized to select a volume, size, type, film material, material compatibility, and ports for the storage container 162. The vent filter carousel 184 may be utilized to select type, material, size, filtration area, connections, and sterilization method of the vent filter 164 for the proper filling of container 162. The operator may access additional features utilizing the menu selection buttons 168. Through these menu selection buttons 168 incorporated into the user-interface design of the visualization system and selected using an input device, the operator may access databases to obtain information of previously tested combinations of components such as the chemical compatibility of the film type with the media material or the filterability database to determine the plugging profile of this particular media type with the fluid processing filter(s). The operator may additionally or alternatively select for the processing device to optimize a particular component of the unit operation or to optimize all of the components in the unit operation based on currently available databases and the selection history of that customer or other customers who have used similar materials and product combinations.

The processing device of the visualization system may further be configured to perform a simulation of the functioning of the setup as configured. The simulation may be based on calculations involving the sizes of the first and second setup components, the dimensions of the connections between the components, and required parameters set by the operator. By simulating the functioning of the setup, the visualization system may automatically identify bottlenecks, restrictions, incomplete paths, dead ends, missing components, wrong connections, and/or other nonsensical configurations. In order to perform the simulation, the processing device may utilize a configurator database of setup components, dimensions, and accessory components. According to one example, the configurator database may also be used to automatically optimize the functioning of the setup for the requested parameters on the basis of the simulation. According to another example, the functioning as simulated may be partially or completely optimized manually by selecting components, dimensions, and accessory components from the configurator database utilizing an input device. The visualization system may additionally or alternatively be utilized to run simulations based on changes made to each of the individual components to determine the effect on processing time, costs, consumables, safety, and other factors. Performing simulations is particularly useful as the complexity of a setup increases or if multiple setups are connected, which can easily result in hundreds of connections that would be difficult to track prior to building the setup and/or ordering the components.

Considering an exemplary setup such as the one shown in FIGS. 3 and 4, the simulation and the corresponding calculations based on a set of parameters may be made to determine the required flow rate, the drain rate, or the venting rate of a fluid through the process setup. For example, the simulation for the fluid connection may comprise calculating the volumes of the first and second containers along with the dimensions of the tubing (length, diameter, material type), the dimensions of the accessory components (such as vent filter sizing, pump size, and so on) in order to obtain the flow rate, which is then provided to the operator through the output device of the visualization system.

A simulation for a fluid connection may also allow the operator to visualize the virtual fluid material moving from the first container to the second container through the virtual fluid connection. Any missing components in the setup can be shown e.g. by displaying virtual fluid leaking out in place of the missing component to highlight the need to complete the configuration by the operator.

The visualization system may have a virtual connection to an existing physical setup of one or more suppliers where the outputs are measured and determined to be the rate of inputs into the downstream processing equipment. Additional calculations could be made, such as splitting a batch into multiple lines or by adding batch processing through a holding or storage tank.

Figure 5:
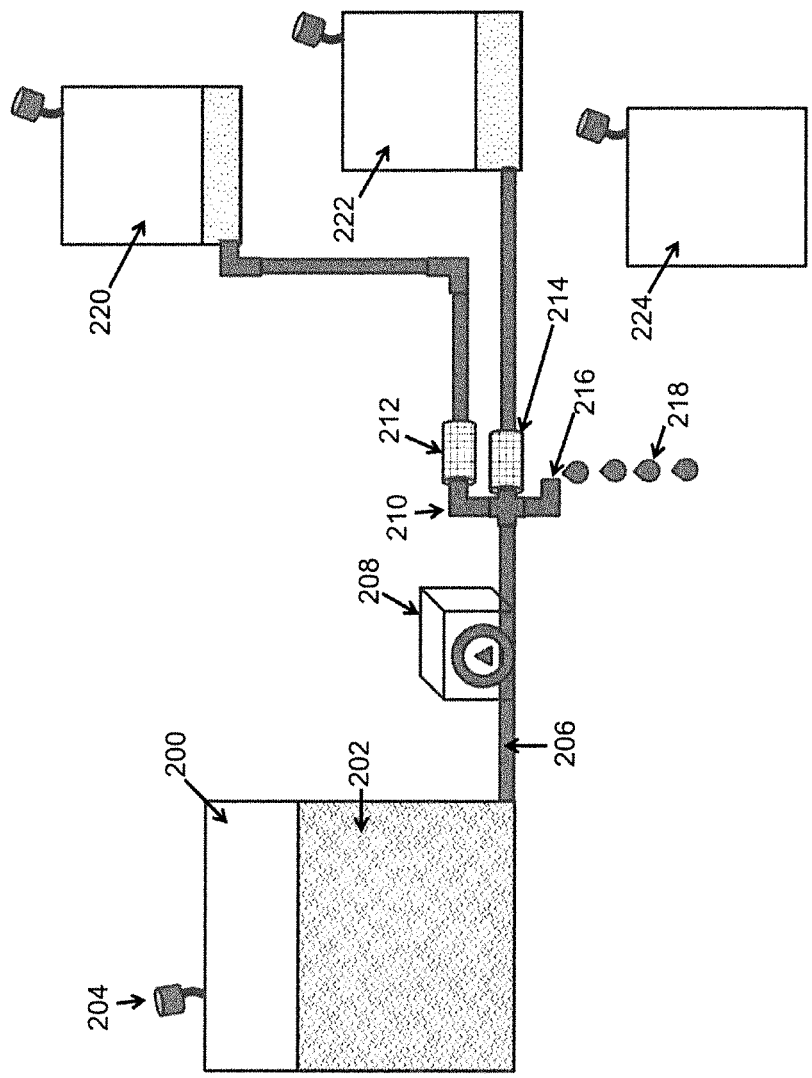
FIG. 5 shows an example of a virtual simulation utilized to determine the optimal configuration for a setup comprising a plurality of components and connections between them.

FIG. 5 shows an example of a virtual simulation utilized to determine the optimal configuration for a setup comprising a plurality of components and connections between them. In this example the operator may have manually configured the virtual components for a setup utilizing an input device through the visualization system. The operator may test if all of the virtual connections were properly made and the effect on fluid flow if any changes to the parameters, components, and/or specifications are made. The setup may exemplarily include virtual components comprising a single-use feed bag 200 filled with a fluid 202, which uses a vent filter 204 for draining, a length of tubing 206 connected to the outlet port, a pump 208 for moving the fluid 202 through the tubing 206, a manifold 210 for splitting the feed fluid 202 into multiple containers, processing filters 212 and 214, and three storage containers 220, 222 and 224 containing vent filters for filling. The operator may initiate a fluid simulation in which the virtual pump 208 starts and moves virtual fluid 202 through the components based on known parameters and behaviors of the fluid 202. In one example, during the manual configuration of the setup, the operator may have inadvertently forgotten to make a connection between the manifold 210 and the storage container 224. The visualization system running the simulation may notify the operator of the missing connection 216, wherein the notification may be reinforced by visualizing the virtual fluid leaking 218 out because of the missing connection.

In addition or as an alternative to a simulation of the functioning of the setup, a cost analysis simulation may be run by the visualization system. The cost analysis simulation may provide a price quote on the setup along with any cost saving calculations, discounts, customer personalized pricing, or other sales incentives from the setup and display the cost information on the output device. Additionally, the visualization system may enable the operator to accept the provided price quote through the output device utilizing an input device. An order may then automatically be placed and processed to purchase the components of the optimized setup.

Figure 6:
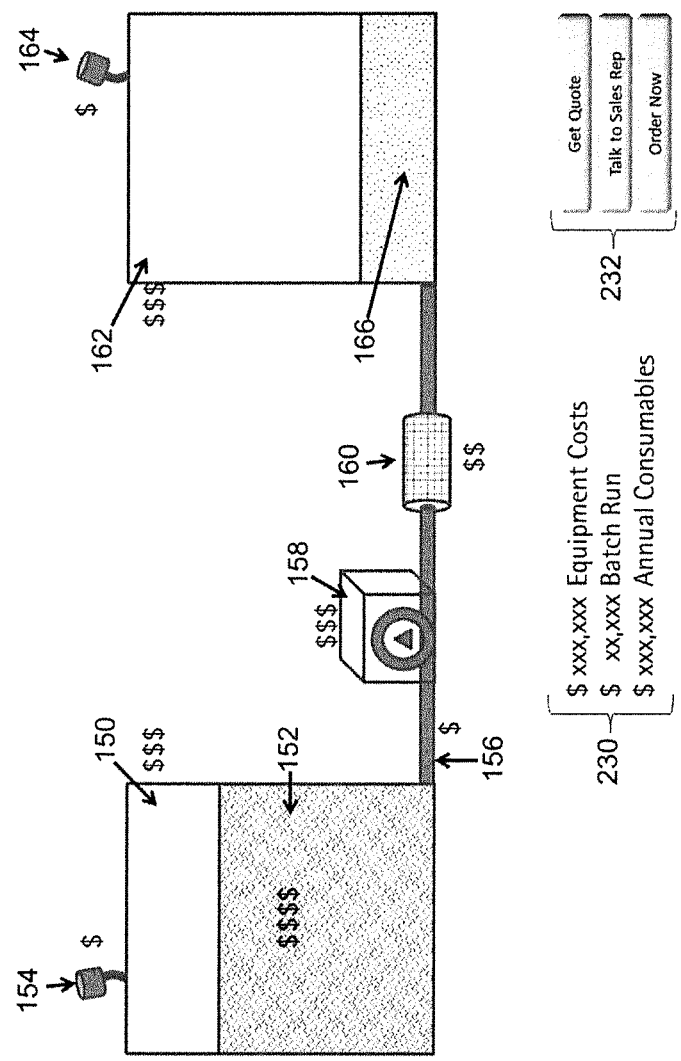
FIG. 6 shows an example of a virtual simulation utilized to determine the optimal pricing for a setup comprising a plurality of components and connections between them.

FIG. 6 shows an example of a virtual simulation utilized to determine the optimal pricing for a setup comprising a plurality of components and connections between them.

In this example the setup may include the feed container 150, the feed fluid 152, the vent filter 154, the tubing 156, the pump 158, the filter 160, the storage container 162, and the vent filter 164, similarly to the example shown in FIG. 3. The operator may run a cost analysis simulation 230 that calculates the pricing to the operator's company for all of the components from the configured design and can determine the costs for capital equipment, the costs for consumables, the costs for a single batch run, the cost savings from a current process utilizing competitor components, the annual costs for consumables based on the number of batches run, and the total cost of ownership. The calculated costs may include, but are not limited to, the equipment, accessories, consumables, service, replacement parts, power consumption, disposal costs, and other relevant factors for the purchasing decision making process. The pricing of the individual and/or paired components may be specific to the operator's company and may incorporate any institutional discounts, preferred pricing, and/or any sales within the purchasing period. The operator may select additional functionality through the menu selection buttons 232 that may be incorporated into the user-interface design of the visualization system and selected using an input device. The operator may utilize the menu selection buttons 232 to obtain a formal quote of the configured and designed setup as well as any related documentation and diagrams. The operator may utilize the menu selection buttons 232 to discuss the configured and designed setup with local sales representative for questions about the setup or pricing, or with a trained applications specialist for his expert recommendations (not shown). The operator may utilize the menu selection buttons 232 to directly order the components of the configured and designed setup or to setup a blanket purchase orders for scheduled deliveries of the components throughout the year. The system may inform the operator about relevant lead times, delays and alternative components available to meet required delivery timelines.

FIGS. 1A-1C and 2A-2C showed examples of configurable connections using physical or virtual markers. One of the physical markers of FIG. 1 was in the form of a marker device. As explained above, a marker device may comprise, among others, a sensing device that may be used to scan the working space and measure distances within it. In one example, the sensing device(s) of one or more marker devices associated with one or more components may be in communication with the capturing device of the visualization system. In another example, the sensing device(s) of one or more marker devices associated with one or more components may function as the capturing device of the visualization system and be in communication with the processing device and the output device. A marker device may be a marker in itself and/or it may comprise a display device to display e.g. a visual marker and/or information about the associated component.

Figure 7C:
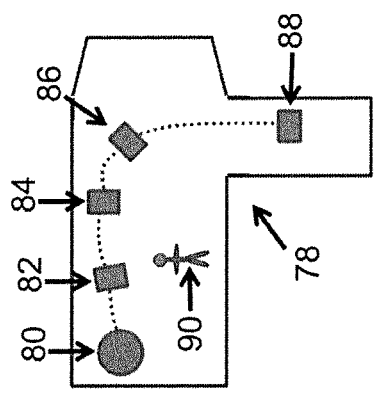
FIGS. 7A-7C show an example of a marker device and its use.
Figure 7B:
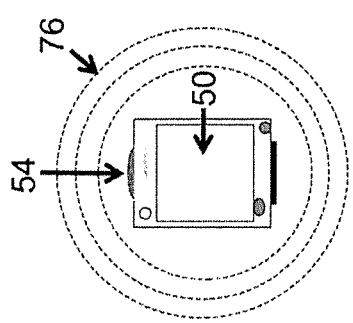
Figure 7A:
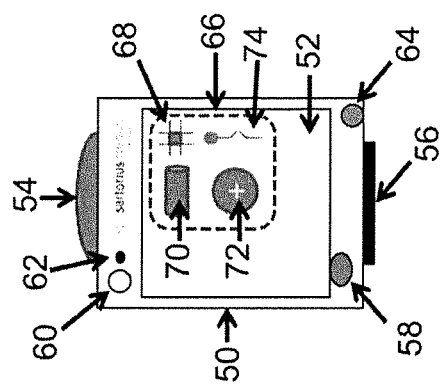

FIGS. 7A-7C shows an example of a marker device and its use. FIG. 7A is a top view of a marker device 50 comprising a sensing device 54 that is capable of performing measurements within a working space. The sensing device 54 may gather positional information regarding where the marker device 50 is located within a space such as a working space by scanning and measuring the distances within the space. In one example, the sensing device 54 may additionally measure the positioning of an operator, one or more other markers associated to one or more virtual or physical components, and/or other objects within the space. Accordingly, the sensing device 54 may measure the distances between the marker device 50 and other elements in the space, and/or between the other elements.

The sensing device 54 may include but is not limited to a depth scanning device (infrared, RGB-D, etc.), a laser range finding device, a LIDAR device, a radar device, an audio device (such as for echolocation or equipment positioning), an ultrasound device, a GPS device, a localized positioning system, a room-based positional system, a motion sensing device, a measuring tape or other measuring device, or other device which may scan and measure the boundaries of the working space as well as the equipment and people inside of the working space.

The marker device 50 may contain a display device 52. The display device 52 may be a means for visual communication. In one example, the display device 52 may display a visual marker such as a variable marker and/or information (such as data about the component associated with the marker device 50, instructions, etc.) to an operator. Additionally or alternatively, the display device may serve as a method of visual communication to the visualization system through the display device 52 itself or through a plurality of intermediate computers that are in communication with the display device 52. The marker device 50 may contain a plurality of buttons 58 that may be utilized as an input device to input or change the information presented by the marker device 50.

The marker device 50 may contain a light sensing device 64 that may detect the level of light within a working space. According to one example, the light sensing device 64 may be used to automatically adjust the screen brightness of the display device 52 for optimal viewing by e.g. an operator and/or for optimal communication with another device. Additionally or alternatively, the light sensing device 64 may be utilized to determine if the visual communication path between e.g. an operator or a device and the marker device 50 is blocked by an obstruction and the visual communication sequence may be halted until the obstruction has been cleared.

The marker device 50 may contain one or more cameras 60 that may be utilized for the visual communication of information to another device and/or may be utilized as a sensing device in addition to or in cooperation with the primary sensing device 54. The variable marker device 50 may contain one or more microphones and/or listening devices 62 for use in conjunction with the primary sensing device 54, if the sensing device 54 is an audio emitting device, ultrasound device, or other audio spectrum device. The microphone(s) may additionally or alternatively be utilized to receive audio instructions from the operator for providing information, changing the display, or altering the settings of the marker device 50. In conjunction with the microphone(s) and listening device(s) 62 a speaker (not shown) may be available on the marker device 50 to provide audio information to the operator.

The marker device 50 may contain an internal processing and communication assembly 66 including a processing device 68, a storage device 70 such as flash memory, a communication device 74 such as a wireless communication device (e.g. WiFi or Bluetooth® communication), and a power device 72 such as a battery or a wired or wireless power source including inductive charging or solar cells.

The marker device 50 may contain a connection port 56, such as a USB port, which may be utilized as a wired/wireless communication port for the transfer of data to and from the marker device 50 and/or for the wired/wireless charging of the power device 72 internal to the marker device 50.

The marker device 50 may additionally include an attachment device (not shown) that may be fixed or removable, such as an adhesive layer, a suction cup, a magnet, Velcro, or other attachment devices, to place the marker device 50 within the working space or on a particular piece of existing equipment within the working space. In additional embodiments RFID's or other forms of electronic communication may be utilized with the marker device 50 for communicating positional and other marker-based information to the display device 52.

FIG. 7B is a top view of the marker device 50 while utilizing the sensing device 54 to scan and measure the surrounding working space 76. The information collected by the sensing device 54 may be utilized to position the virtual and/or physical objects relative to the working space, relative to other marker devices, and/or relative to the operator. The sensed working space 76 with the positional information may be displayed on the display device 52. This positional information may be utilized to determine the measured distances between the virtual and/or physical components, provide real-time measurements, and to provide the measurements and positions for the virtual connections between virtual and/or physical components.

FIG. 7C is a top view of a working space 78 containing multiple marker devices to provide to an operator 90 a view of the virtual components 82, 84, 86 and 88 to which the marker devices are associated and the virtual connections between them via a visualization system output device. The working space 78 may include a physical component 80, such as a tank, which exists within the room, and virtual components 82, 84, 86 and 88 that utilize marker devices for positioning within the working space 78. The marker devices for components 82, 84, 86, and 88 may scan the working space 78 using their sensing devices and measure the working space, the distances to one another, the distances to physical components within the working space 78 such as the physical tank 80, the distance of the operator 90, as well as provide the measurements for the connections between each of the physical and virtual objects. The marker devices may communicate their positional and measurement data directly to the visualization system through wireless communication method and/or through a visual communication method. The marker devices may additionally or alternatively communicate the positional and measurement data to a computer located within or nearby the working space 78, to a remote computer system such as a cloud computing resource, or through a network or a distributed computing network between multiple devices internal and/or external to the working space 78.

Figure 8:
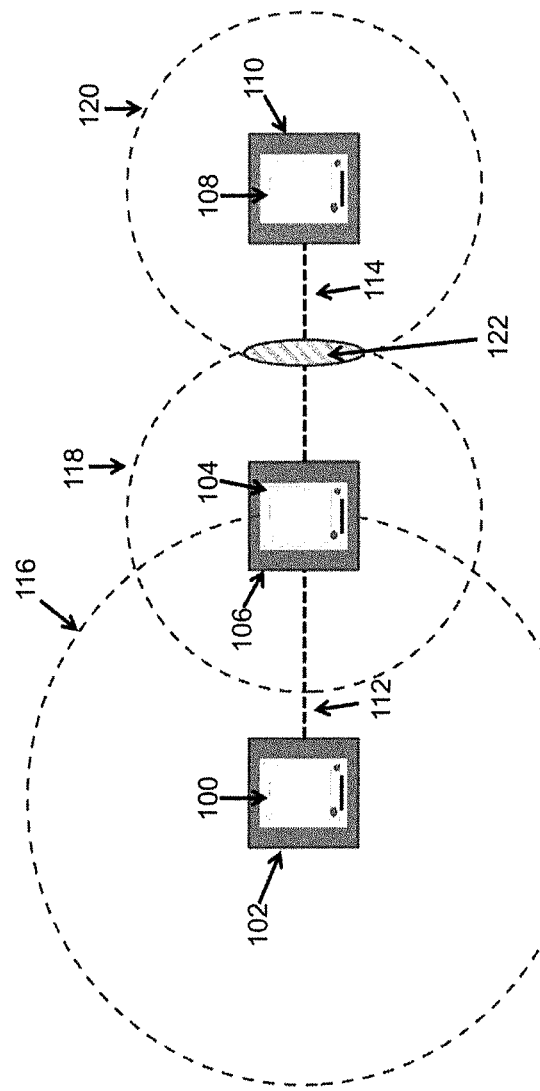
FIG. 8 shows an example of configurable connections between a plurality of virtual components utilizing a plurality of marker devices as the one shown in FIG. 7.

FIG. 8 shows an example of configurable connections between a plurality of virtual components utilizing a plurality of marker devices as the one shown in FIG. 7. FIG. 8 is a top view of three marker devices 100, 104 and 108 that are used in combination with a visualization system comprising an output device. The marker devices 100, 104 and 108 are positioned within a workspace and provide positioning and scaling for virtual components 102, 106 and 110, respectively. An operator views the virtual components 102, 106 and 110 on the output device of the visualization system. The virtual components 102, 106 and 110 may be connected via virtual connections 112 and 114 by the visualization system. These virtual connections 112 and 114 may be scaled to match the sizing of each of the virtual components 102, 106 and 110. The distances between the marker devices 100, 104 and 108 may be measured by a capturing module of the visualization system utilized by the operator or may be scanned by the sensing devices on the marker devices 100, 104 and 108 themselves. Additionally or alternatively the marker devices 100, 104 and 108 may communicate with one another to provide measurements to each other. This communication between the marker devices 100, 104 and 108 may occur through the communication devices such as through Bluetooth®, WiFi, or other electronic communication method, by detection of the signals emitted by the sensing device of another marker device, through the cameras and display screens for visual communication, or through the audio devices and the microphones on each device.

According to one example, the marker device 100 may emit a signal 116 from the sensing device which is within range of the marker device 104 and may be detected by the marker device 104. The signal 116 may be measured for signal strength, direction, position, and distance, as well as being identified as coming from another device. The marker devices 104 and 108 may emit signals 118 and 120 that are not within the range of the marker devices 104 and 108 themselves but are within range of the sensing device detection limit of the marker devices 104 and 108. This overlap 122 in the emitted signals 118 and 120 is within the range of detection by the sensing devices of the marker devices 104 and 108. Therefore, the emitted signals 118 and 120 may still be detected. This detection of the emitted signals 118 and 120 may be utilized for measuring the signal strength, the direction, the position, the distance, and any unique identifiers that differentiate the variable marker devices 104 and 108.

As discussed above, the capturing module may perform many different kinds of data acquisition about the workspace and the components, one of which is the measuring of distances. Also the sensing device of the marker device discussed with reference to FIGS. 7 and 8 is configured to measure distances. Alternatively or additionally, an external measuring tool may be used for measuring distances. According to some examples, the external measuring tool may be integrated with the capturing module and/or the marker device. The external measuring tool may comprise measurement markers that can be positioned at or on the components for measurement. The measurement markers may consist of visual markers, electromagnetic markers, RFID's, metal stripes, magnetic markers, audio markers, or other marker types.

FIGS. 9A-9C show examples of external measuring tools for the manual measurement of distances. In this example, a measuring tape is used for manually measuring the distances between objects. Although a measuring tape is represented in this example, a ruler, Carpenter's square, level, or other tool may utilize the same methods. FIG. 9A is a side view of a measuring tape 300 with a locking mechanism 302, the spooled tape 304, a visual identification marker 306 on the measuring tape's stop, and a sliding visual identification marker 308. The sliding visual identification marker 308 may slide along the spooled tape 304 between the visual identification marker 306 on the measuring tape's stop and the body of the measuring tape 300. A camera or other sensing device may accurately measure the distance between the positions of the two visual markers if the visual markers are of a known size. The size measurement between the visual identification marker 306 on the measuring tape's stop and the sliding visual identification marker 308 may be recorded utilizing an input device on output device of the visualization system or through an external input device.

FIG. 9B is a side view of a measuring tape 310 with a locking mechanism 312, the spooled tape 314, a magnetic marker 316 on the measuring tape's stop, and a sliding magnetic marker 318. The sliding magnetic marker 318 may slide along the spooled tape 314 between the magnetic marker 31) on the measuring tape's stop and the body of the measuring tape 310. A sensing device that can detect magnetic fields may accurately measure the distance between the positions of the two magnetic markers utilizing a magnetometer, if the magnetic markers are of a known size and polarity. The size measurement between the magnetic marker 316 on the measuring tape's stop and the sliding magnetic marker 318 may be recorded utilizing an input device on the output device of the visualization system or through an external input device.

FIG. 9C is a side view of a measuring tape 320 with a locking mechanism 322, the spooled tape 324, a sensing device 326, such a camera, positioned over the tape 324, and a marker device 328 incorporated into the design of the measuring tape 320 and/or externally attached. As the measuring tape is spooled, the sensing device may detect measurements along the length of the tape by reading the numbers, a barcode or other coded system, or a non-visible coding such as infrared. The sensing device may be located externally or internally to the measuring tape 320 body. For example, as shown, the sensing device 326 may be incorporated into the design of the locking mechanism 322. In another example, the sensing device may be a rotating wheel or other mechanism which may accurately determine the number of rotations as the measuring tape is dispensed and retracted prior to recording the measured position. The marker device 328 may be connected to the sensing device 326 through a wired and/or wireless connection. The variable marker device 328 may receive the measurements from the sensing device 326 and communicate them to the visualization system utilizing visual communication, electronic communication, or other communication methods. A button on the variable marker device 328 may record the measurement for communication to the visualization system. After the transmission of the measurements has been completed, the visualization system may communicate back to the marker device 328 that the data has been received. The measurements can then be incorporated into the augmented and/or virtual content to provide the operator with the distances between physical and/or virtual components within a workspace and the virtual connections between the components.

What is claimed is:

1. A method for selecting a connection within a measurement or production setup, the method comprising the steps of:
    providing a visualization system with a processing device, an output device, and at least one capturing module, whereby the at least one capturing module is capable of capturing identification and spatial data regarding objects in a working space;
    providing a plurality of first setup components in the working space, each of the first setup components having at least one first marker;
    providing a plurality of second setup components in the working space, each of the second setup components having at least one second marker, each of the second setup components being connectable to a specified one of the first setup components via at least one connection component;
    capturing identification data regarding the first marker and the second marker by the at least one capturing module to identify the first and second markers, wherein the at least one capturing module measures spatial data comprising at least one of the dimensions of the working space and a distance between the at least one first marker and the at least one second marker;
    using the processing device to retrieve digital information from a database, the digital information being assigned to the identified first and second markers;
    using the processing device to determine the at least one connection component to connect the specified first setup component to at least one of the second setup components based on the retrieved digital information and the measured spatial data; and
    outputting a configurable visual representation of the determined at least one connection component connecting the specified first setup component and the at least one second setup component.

2. The method of claim 1, wherein the visualization system is at least one of an augmented reality system, a virtual reality system, and a mixed reality system.

3. The method of claim 1, wherein the captured identification data comprise a position of the first marker and the second marker within the working space, and wherein the method further comprises modifying the decision to determine the at least one connection component when the position of at least one of the first and second markers within the working space is modified.

4. The method of claim 1, wherein the at least one connection component connecting the first setup component and the second setup component comprises at least one of a fluid connection, a data connection, a moving connection, a power connection, an input connection, and an output connection.

5. The method of claim 1, wherein the at least one capturing module communicates the spatial data to the output device.

6. The method of claim 5, wherein the at least one capturing module comprises measurement markers.

7. The method of claim 1, wherein the at least one capturing module comprises at least one of a camera, a video camera, a depth scanning device, a laser scanning device, a LIDAR device, radar, a signal scanning device, an audio scanning device, an echolocation device, a tape measure, a ruler, a carpenter's square, and a level.

8. The method of claim 1, wherein at least one of the first and second setup components is a single-use component.

9. The method of claim 1, wherein at least one of the first and second markers of the setup components consists of a variable marker that has at least two different states.

10. The method of claim 1, wherein at least one of the first and second markers of the setup components consists of at least one virtual marker, wherein the at least one virtual marker is positioned on the output device using a position in the working space captured by the at least one capturing module and processed by the processing device.

11. The method of claim 10, wherein the at least one virtual marker is virtually moved into position within the working space using at least one input device.

12. The method of claim 11, wherein the at least one input device is at least one of a touch screen device, a hand tracking device, a gesture tracking device, a body tracking device, an eye-tracking device, a gaze tracking device, an electromyography (EMG) tracking device, a human controlled interface, a keyboard, a mouse, a stylus, and gloved sensors.

13. The method of claim 1, further comprising performing a simulation of the functioning of the setup including the first and second setup components and the at least one connection component connecting them.

14. The method of claim 13, wherein the simulation is based on the sizes of the first and second setup components, the dimensions of the at least one connection component connecting the components, and at least one parameter set entered by an operator.

15. The method of claim 14, wherein the simulation is automatically optimized by the processing device utilizing a configurator database of setup components, dimensions, and accessory components on the basis of the at least one set parameter.

16. The method of claim 14, wherein the simulation is at least partially optimized manually by selecting components, dimensions, and accessory components from a configurator database utilizing an input device.

17. A non-transitory computer-readable medium configured to store a computer program for selecting a connection in a measurement or production setup, wherein the computer program comprises coding segments that enable a computing system to execute the method of claim 1.

18. A visualization system for selecting connections in a measurement or production setup, the visualization system comprising:
at least one capturing module capable of capturing identification data regarding objects in a working space, wherein the at least one capturing module further measures spatial data comprising at least one of the dimensions of the working space and a distance between at least one first marker and at least one second marker;
a processing device communicatively connected to the at least one capturing module, the processing device being capable of:
detecting the presence of and identifying first markers associated respectively with first setup components and second markers associated respectively with second setup components from identification data regarding the first and second markers captured by the at least one capturing module, wherein each of the second setup components is connectable respectively to a specified one of the first setup components via at least one connection component;
retrieving digital information from a database, the digital information being assigned to the identified first and second markers;
receiving the measured spatial data regarding the first and second setup components from the at least one capturing module; and
selecting, from a plurality of selectable connection components, the at least one connection component for connecting the first setup component with the second setup component, the decision to select the at least one connection component being based on the retrieved digital information and the measured spatial data; and
an output device for outputting a configurable visual representation of the at least one connection component connecting the specified first setup component and at least one second setup component.

19. The visualization system of claim 18, wherein the visualization system is at least one of an augmented reality system, virtual reality system, and a mixed reality system.

20. The visualization system of claim 18, wherein the captured identification data comprise a position of the first marker and the second marker, and the processing device is further capable of modifying the decision for selecting the at least one connection component when the position of at least one of the first and second markers is modified.

* * * * *